US010755609B1

(12) United States Patent
Harris

(10) Patent No.: US 10,755,609 B1
(45) Date of Patent: Aug. 25, 2020

(54) SOLAR-POWERED VIVID VIEW ADDRESS NUMBERS

(71) Applicant: Theresa Harris, Chicago, IL (US)

(72) Inventor: Theresa Harris, Chicago, IL (US)

(*) Notice: Subject to any disclaimer, the term of this patent is extended or adjusted under 35 U.S.C. 154(b) by 0 days.

(21) Appl. No.: 16/715,220

(22) Filed: Dec. 16, 2019

Related U.S. Application Data

(60) Provisional application No. 62/869,287, filed on Jul. 1, 2019.

(51) Int. Cl.

| G09F 13/04 | (2006.01) |
| H02S 20/26 | (2014.01) |
| H02S 40/38 | (2014.01) |
| F21S 9/03 | (2006.01) |
| G09F 7/16 | (2006.01) |
| G09F 13/42 | (2006.01) |
| F21V 23/04 | (2006.01) |
| F21Y 115/10 | (2016.01) |
| F21W 131/40 | (2006.01) |
| F21W 131/30 | (2006.01) |

(52) U.S. Cl.
CPC .......... *G09F 13/0404* (2013.01); *F21S 9/037* (2013.01); *F21V 23/0464* (2013.01); *G09F 7/16* (2013.01); *G09F 13/42* (2013.01); *H02S 20/26* (2014.12); *H02S 40/38* (2014.12); *F21W 2131/30* (2013.01); *F21W 2131/40* (2013.01); *F21Y 2115/10* (2016.08)

(58) Field of Classification Search
CPC ......... G09F 13/0404; G09F 7/16; F21S 9/037
See application file for complete search history.

(56) References Cited

U.S. PATENT DOCUMENTS

| 2,895,245 A * | 7/1959 | Spangler | G09F 13/0404 40/552 |
| 3,755,943 A * | 9/1973 | Cesarotti | G09F 13/0404 40/552 |
| 3,937,384 A * | 2/1976 | Minogue | G09F 7/14 228/120 |
| 4,327,511 A | 5/1982 | Rodriquez | |
| 4,714,581 A * | 12/1987 | Witt | G09F 13/0404 264/250 |
| 4,931,780 A | 6/1990 | LaMont et al. | |
| 5,573,328 A | 11/1996 | Hwang | |
| 6,042,248 A * | 3/2000 | Hannah | G09F 13/0404 362/235 |
| 6,173,517 B1 * | 1/2001 | Eibner | G02B 6/0001 362/240 |
| 6,443,593 B1 * | 9/2002 | Lauschner | G09F 13/04 362/239 |

(Continued)

*Primary Examiner* — Gary C Hoge
(74) *Attorney, Agent, or Firm* — Olson & Cepuritis, Ltd.

(57) ABSTRACT

Individual address numbers are provided which can be illuminated using solar energy to completely power the illumination at night would result in great savings in electricity to residential consumers and commercial establishments. The foregoing features are provided by equipping individual address numbers with the necessary elements and circuitry to gather and store solar energy for use in the evening to power light emitting diodes to illuminate each respective individual number. Additionally, wireless capability may be provided which allows the illumination of the individual address numbers to be turned on and off in the event illumination is needed prior to darkness.

17 Claims, 4 Drawing Sheets

(56) References Cited

U.S. PATENT DOCUMENTS

| | | | | |
|---|---|---|---|---|
| 6,491,412 B1* | 12/2002 | Bowman | ............ | G09F 13/0404 |
| | | | | 362/241 |
| 6,594,931 B1* | 7/2003 | Barton | ................... | G09F 13/00 |
| | | | | 40/552 |
| 7,118,251 B1* | 10/2006 | Chambers | .......... | G09F 13/0404 |
| | | | | 362/311.02 |
| 9,347,629 B2 | 5/2016 | Stork et al. | | |
| 2001/0042330 A1* | 11/2001 | Grate | ..................... | G09F 13/04 |
| | | | | 40/552 |
| 2002/0104241 A1* | 8/2002 | Grate | ..................... | G09F 13/04 |
| | | | | 40/552 |
| 2002/0159257 A1* | 10/2002 | Grajcar | .............. | G09F 13/0404 |
| | | | | 362/231 |
| 2003/0009924 A1* | 1/2003 | Sajadian | ................ | G09F 13/04 |
| | | | | 40/564 |
| 2003/0063463 A1* | 4/2003 | Sloan | ..................... | F21V 29/74 |
| | | | | 362/238 |
| 2003/0112627 A1* | 6/2003 | Deese | ................ | G09F 13/0404 |
| | | | | 362/249.01 |
| 2003/0182833 A1* | 10/2003 | Lewis | ................ | G09F 13/0404 |
| | | | | 40/551 |
| 2004/0022069 A1 | 2/2004 | Zugelder | | |
| 2004/0031177 A1* | 2/2004 | Gordon | .................... | G09F 7/16 |
| | | | | 40/551 |
| 2005/0024855 A1 | 2/2005 | Ruiz et al. | | |
| 2010/0064559 A1* | 3/2010 | Dal Cavaliere | ........ | B26F 3/004 |
| | | | | 40/545 |
| 2010/0085743 A1* | 4/2010 | Franklin | ................ | F21S 9/037 |
| | | | | 362/183 |
| 2015/0055329 A1 | 2/2015 | Demourtzidis | | |
| 2016/0225295 A1* | 8/2016 | Yoon | ................... | G09F 13/0404 |
| 2018/0286294 A1* | 10/2018 | Saito | ......................... | G09F 7/14 |

* cited by examiner

SOLAR-POWERED VIVID VIEW ADDRESS NUMBERS

CROSS-REFERENCE TO RELATED APPLICATION

This application claims the benefit of U.S. Provisional Application No. 62/869,287 filed Jul. 1, 2019 and hereby incorporates the entire disclosure of that application by reference.

FEDERALLY SPONSORED RESEARCH OR DEVELOPMENT

Not Applicable.

BACKGROUND THE INVENTION

When driving in the evening and attempting to locate street addresses in residential neighborhoods and commercial areas, the address numbers are more often than not difficult, if not impossible to read at dusk or after sundown. One must often direct headlights or flashlights on the front or sides of buildings to determine whether or not he or she has arrived at the correct destination. The difficulty in reading address numbers is particularly concerning for first responders in emergency situations.

Various types of illuminated address numbers are known in the prior art. For example, U.S. Pat. No. 4,931,780 and U.S. Pat. Appln. Nos. 2005/0024855 and 2015/0055329 each disclose illuminated building address signs. U.S. Pat. Nos. 4,327,511, 5,007,190 and 5,573,328 and U.S. Pat. Appln. No. 2004/0022069 each discloses solar powered illuminable building address numbers and signs.

However, none of the prior art set forth above provides address numbers with the ability to individually collect and store solar energy during daylight hours and individually illuminate each number at nighttime when one or more photosensitive sensors in each individual number would be activated. The individual numbers are separately mountable on a building by means of nails, screws or adhesive bonding and thus can be easily individually replaced when needed. Use of solar energy to completely power the illumination of the numbers at night would result in great savings in electricity to residential consumers and commercial establishments. The present invention provides the foregoing features by providing individual address numbers which have the necessary elements and circuitry to gather and store solar energy for use in the evening to power light emitting diodes to illuminate each respective individual number.

SUMMARY OF THE INVENTION

The present invention relates generally to address numbers which are provided which are able to individually collect and store solar energy during daylight hours and then individually illuminate each respective number at nighttime when one or more photosensitive sensors in each individual number is activated. The individual numbers are separately mountable on a building by means of nails, screws or adhesive bonding and thus can be easily individually replaced when needed. The numbers may also be provided with wireless capability to be turned on and off in the event illumination is needed prior to darkness.

Individual address numbers which can be illuminated using solar energy to completely power the illumination at night would result in great savings in electricity to residential consumers and commercial establishments. The present invention provides the foregoing features by providing individual address numbers which have the necessary elements and circuitry to gather and store solar energy for use in the evening to power light emitting diodes to illuminate each respective individual number.

DETAILED DESCRIPTION OF THE PREFERRED EMBODIMENT

Figure 1:
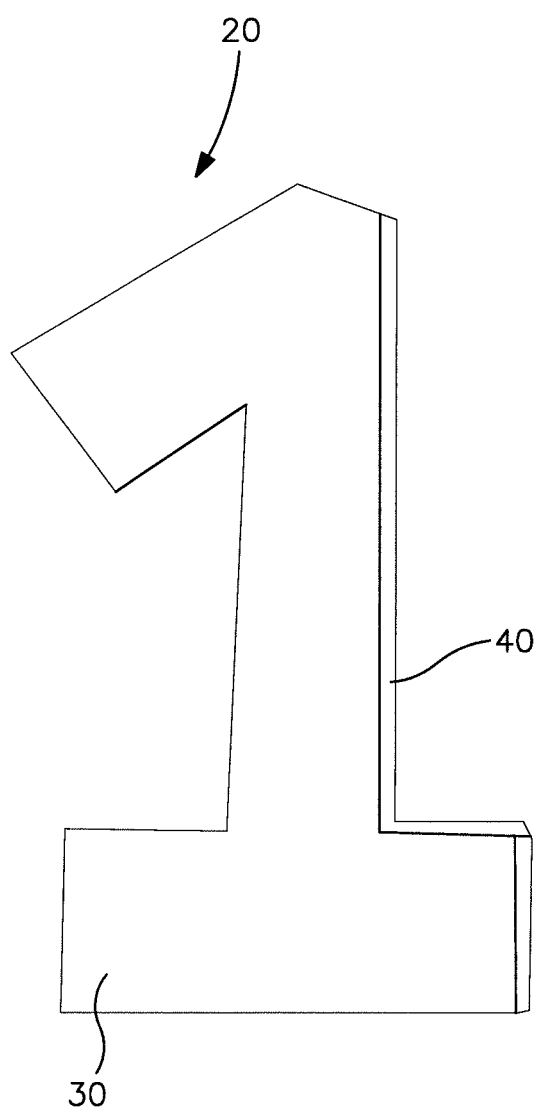
FIG. 1 is a front view of a body of a single number, in this case the number "1."
Figure 2:
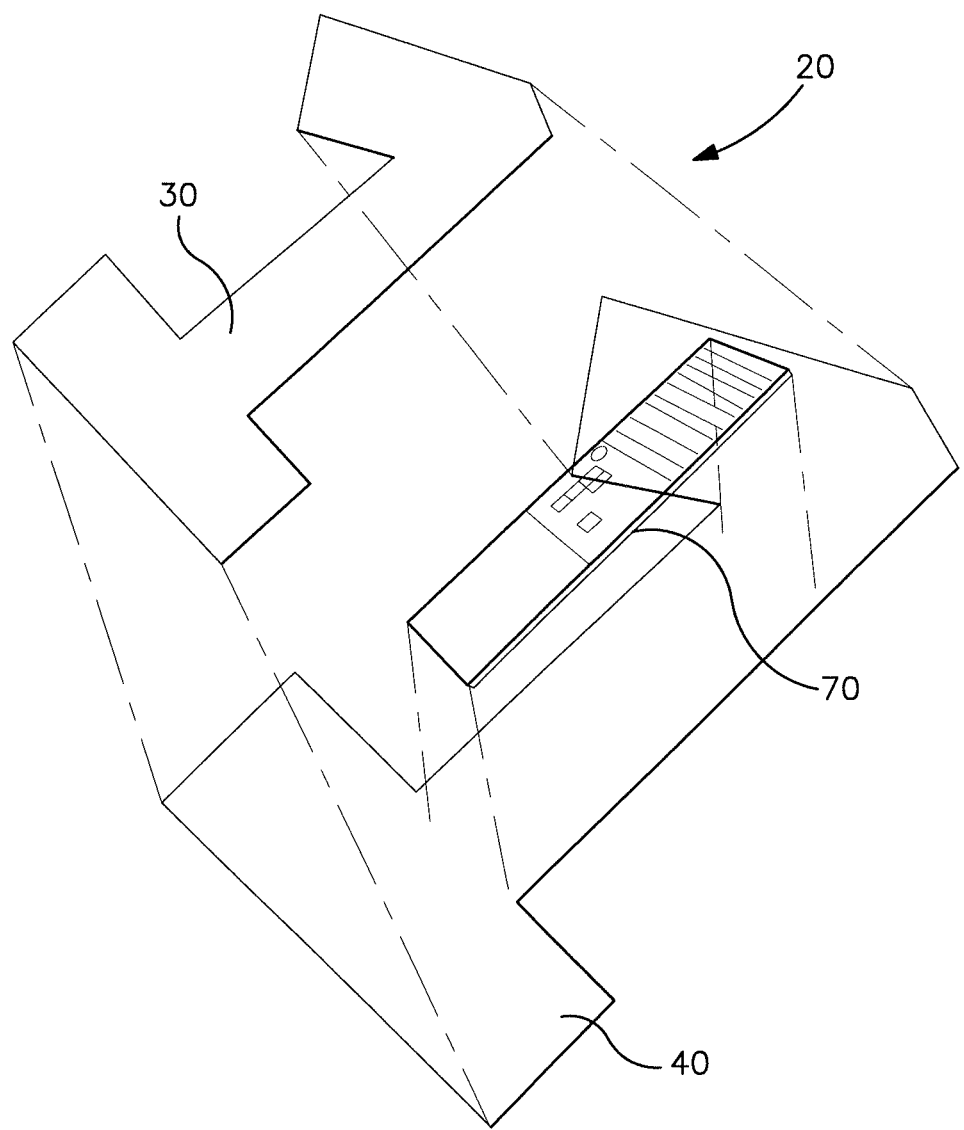
FIG. 2 is a side view exploded view of the number 1 illustrating a back portion and a front portion with the apparatus or mechanism for collecting and using solar energy sandwiched between the front and back portions.
Figure 3:
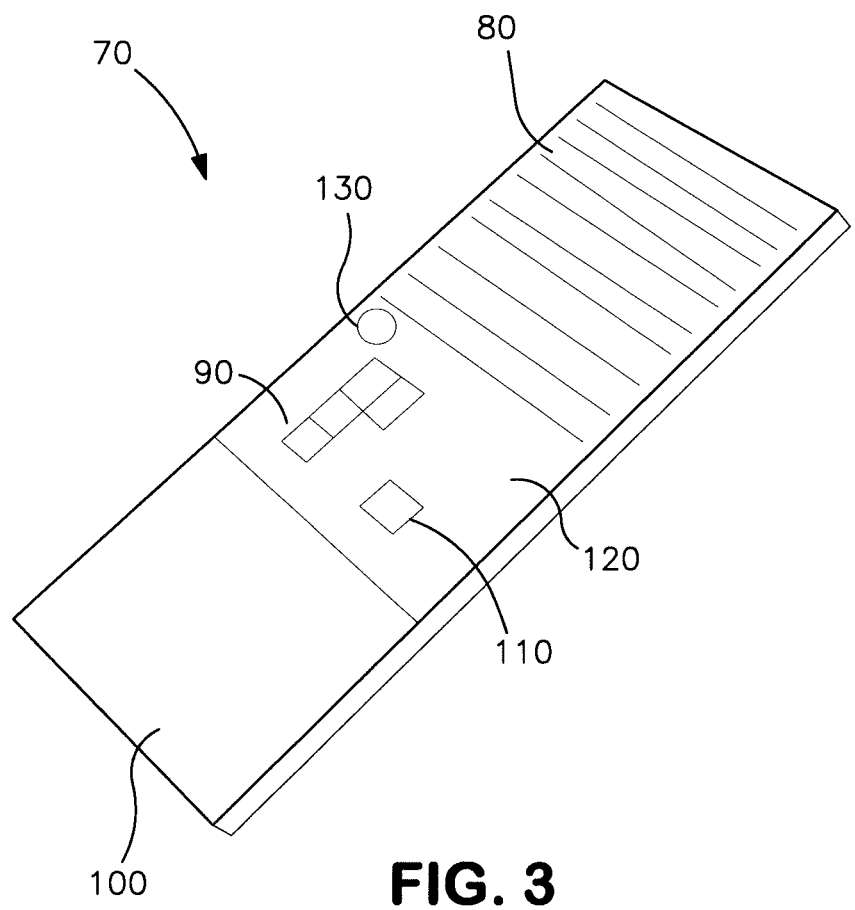
FIG. 3 is a front view of the apparatus for collecting and using solar energy depicted in FIG. 2.

The address numbers of the present invention are explained with reference to FIGS. 1 to 3. In FIG. 1, the number 1 is shown as an example. Of course, the following discussion applies equally to numbers 2 through 9 and may also apply to the letters of the alphabet. The number 1, identified as item 20, is shown generally as having a front panel 30 and a back panel 40. Both front and back panels can be made from any resilient plastic materials, with front panel 30 being made from a clear plastic or PVC material. Front panel 30 and back panel 40 are also provided with mating surfaces, such as grooves or ridges around the exterior edges to assemble the front and back sections with each other. As shown in FIG. 2, the apparatus or mechanism for collecting and using solar energy 70 is located between the front and back portions, 30 and 40.

Figure 1A:
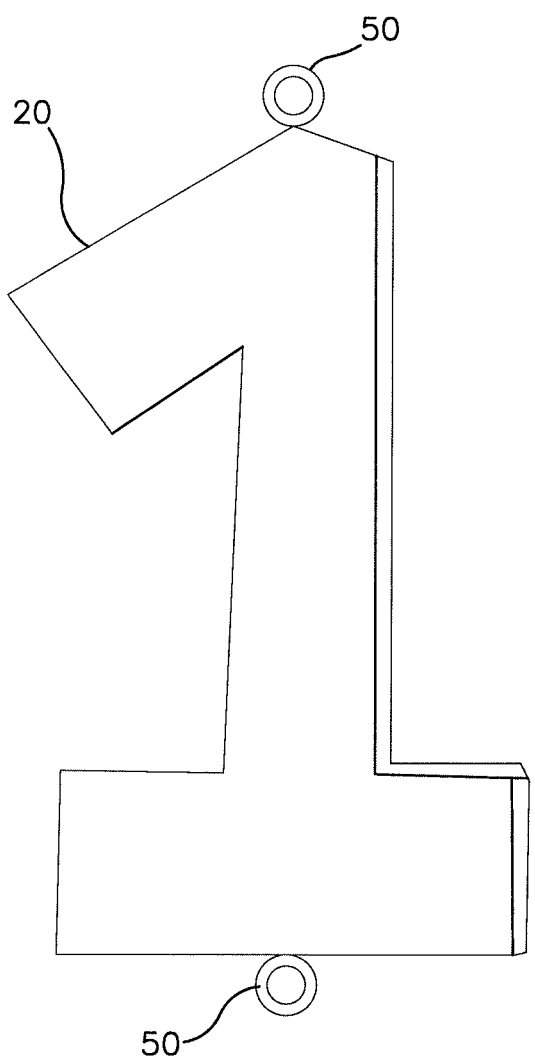
FIG. 1a is a front view of the number 1 having optional attaching extensions at the top and bottom of the number.

As shown in FIG. 1a, the address number 20 may be provided with plastic rings 50 to allow for individual attachment of the address number 20 to a residential or commercial building or a stand-alone sign. Alternatively, the address number 20 may be attached by means of an adhesive applied to the back panel 40. In this way, the individual numbers can be mounted or unmounted independent of any other address numbers.

FIG. 2 is an exploded view of solar powered illuminated address number of the present invention. In FIG. 2, the apparatus or mechanism for gathering and using solar energy 70 is positioned between the front and back portions, 30 and 40, of the number 20. As shown in FIGS. 2 and 3, the solar gathering/using apparatus 70 includes one or more solar panels 80, that is, a photovoltaic panel, a battery charger 90 which is in communication with solar panel 80, at least one rechargeable battery 100 (for example, a lithium battery) which is in communication with battery charger 90 and at least one light emitting diode (LED) 110 which is in communication with rechargeable battery 100. Additionally, a photo detector 130, to detect when dusk arrives, is included which is in communication with LED 110 to turn on LED 110 and illuminate number 20 at night.

One or more of the foregoing elements, may be included on a printed circuit board (PCB) 120 to electrically connect the elements as set forth above. Additionally, other elements to control charging of rechargeable battery 100, current flow to LED 110 and communication between photo detector 130 and LED 110. Alternatively, wireless communications between the foregoing elements may also be established and used.

In one embodiment, the illuminated address number 20 of the present invention is assembled by placing the PCB 120 between front portion 30 and back portion 40 and connecting front and back portions, 30 and 40, by snapping them together at their respective mating surfaces. In this manner, if PCB 120 needed to be replaced, the front and back portions, 30 and 40, could be separated, a new PCB could be inserted and the front and back portions could be snapped back together. In another embodiment, the front and back portions could be permanently joined together using adhesive so that the entire structure would be replaced if PCB 120 malfunctions.

Once the illuminated address numbers are fully assembled, they may be mounted to a residential or commercial building by using nails, screws or heavy duty adhesive. Once mounted, the solar panel 80 in each individual address number gathers energy from the sun, transmits the energy through battery charger 90 to rechargeable battery 100. When darkness or dusk arrives, photo detector 130 communicates with LED 110 to turn on LED 110 to illuminate number 20.

The previous descriptions are of the preferred embodiments for implementing the invention and the scope of the invention should not be limited by this description.

What is claimed is:

1. Individual illuminated address numbers for identifying residential or commercial addresses comprising:
   a front and back panel in the shape of a number from 1 to 9;
   the front and back panels made from clear plastic or PVC materials;
   at least one solar panel positioned between the front and back panels;
   at least one battery charger in communication with the solar panel and at least one rechargeable battery positioned between the front and back panels;
   the rechargeable battery being in communication with at least one light emitting diode positioned between the front and back panels; and
   at least one photo detector in communication with the light emitting diode positioned between the front and back panels;
   wherein once the number fully assembled and mounted on an exterior surface the at least one solar panel gathers energy from the sun, transmits the energy through the battery charger to the rechargeable battery so that when the photo detector detects dusk or darkness, the photo detector turns on the light emitting diode to illuminate the number.

2. The illuminated number of claim 1 wherein one or more of the solar panel, battery charger, rechargeable battery, light emitting diode and photo detector are included on a printed circuit board.

3. The illuminated number of claim 1 wherein the back panel is provided with an adhesive material for mounting the illuminated number to a surface.

4. The illuminated number of claim 1 wherein structure is provided on the top or bottom portions or both of the number for mounting the illuminated number to a surface.

5. The illuminated number of claim 1 wherein one or more illuminated numbers may be used and individually mounted to an exterior surface.

6. Individual illuminated address letters for identifying residential or commercial addresses comprising:
   a front and back panel in the shape of a letter from A to Z;
   the front and back panels made from clear plastic or PVC materials;
   at least one solar panel positioned between the front and back panels;
   at least one battery charger in communication with the solar panel and at least one rechargeable battery positioned between the front and back panels;
   the rechargeable battery being in communication with at least one light emitting diode positioned between the front and back panels; and
   at least one photo detector in communication with the light emitting diode positioned between the front and back panels;
   wherein once the letter fully assembled and mounted on an exterior surface the at least one solar panel gathers energy from the sun, transmits the energy through the battery charger to the rechargeable battery so that when the photo detector detects dusk or darkness, the photo detector turns on the light emitting diode to illuminate the letter.

7. The illuminated letter of claim 6 wherein one or more of the solar panel, battery charger, rechargeable battery, light emitting diode and photo detector are included on a printed circuit board.

8. The illuminated letter of claim 6 wherein the back panel is provided with an adhesive material for mounting the illuminated letter to a surface.

9. The illuminated letter of claim 6 wherein structure is provided on the top or bottom portions or both of the letter for mounting the illuminated letter to a surface.

10. The illuminated letter of claim 6 wherein one or more illuminated letter may be used and individually mounted to an exterior surface.

11. Individual illuminated address numbers or letters for identifying residential or commercial addresses comprising:
    a front and back panel in the shape of a number from 1 to 9 or a letter from A to Z;
    the front and back panels made from clear plastic or PVC materials;
    at least one solar panel positioned between the front and back panels;
    at least one battery charger in communication with the solar panel and at least one rechargeable battery positioned between the front and back panels;
    the rechargeable battery being in communication with at least one light emitting diode positioned between the front and back panels; and
    at least one photo detector in communication with the light emitting diode positioned between the front and back panels;
    wherein once the number or letter is fully assembled and mounted on an exterior surface the at least one solar panel gathers energy from the sun, transmits the energy through the battery charger to the rechargeable battery so that when the photo detector detects dusk or darkness, the photo detector turns on the light emitting diode to illuminate the number or letter.

12. The illuminated number or letter of claim 11 wherein one or more of the solar panel, battery charger, rechargeable battery, light emitting diode and photo detector are included on a printed circuit board.

13. The illuminated number or letter of claim 11 wherein the back panel is provided with an adhesive material for mounting the illuminated number or letter to a surface.

14. The illuminated number or letter of claim 11 wherein structure is provided on the top or bottom portions or both of the number or letter for mounting the illuminated number or letter to a surface.

15. The illuminated number or letter of claim 11 wherein one or more illuminated number or letter may be used and individually mounted to an exterior surface.

16. The illuminated number or letter of claim 11 wherein a combination of illuminated numbers or letters may be used and individually mounted to an exterior surface.

17. The illuminated number or letter of claim 11 wherein a combination of illuminated numbers and letters may be used and individually mounted to an exterior surface.

\* \* \* \* \*